(12) United States Patent
Ye et al.

(10) Patent No.: US 11,011,905 B2
(45) Date of Patent: May 18, 2021

(54) FALL-OFF PROTECTION AND REVERSE-CONNECTION PROTECTION SYSTEM AND METHOD FOR CONNECTING CLAMP OF AUTOMOBILE STARTING POWER SUPPLY

(71) Applicant: Dongguan Zhongkang Technology Electronics Co., LTD, Dongguan (CN)

(72) Inventors: Jianxin Ye, Dongguan (CN); Yuping Luo, Fengcheng (CN); Shihao Huang, Jiujiang (CN)

( * ) Notice: Subject to any disclaimer, the term of this patent is extended or adjusted under 35 U.S.C. 154(b) by 472 days.

(21) Appl. No.: 15/928,725

(22) Filed: Mar. 22, 2018

(65) Prior Publication Data

US 2018/0278042 A1  Sep. 27, 2018

(30) Foreign Application Priority Data

Mar. 20, 2017 (CN) .......................... 201710167216.0

(51) Int. Cl.
| | |
|---|---|
| *H02H 3/18* | (2006.01) |
| *H02H 1/00* | (2006.01) |
| *H02H 3/24* | (2006.01) |
| *H02H 11/00* | (2006.01) |
| *B60R 16/02* | (2006.01) |

(52) U.S. Cl.
CPC ............ *H02H 3/18* (2013.01); *H02H 1/0007* (2013.01); *H02H 3/243* (2013.01); *H02H 11/003* (2013.01); *B60R 16/02* (2013.01)

(58) Field of Classification Search
CPC ........ H02H 3/18; H02H 1/0007; H02H 3/243; H02H 11/003; H01R 11/24; H01R 11/04; H01R 11/281; H01R 11/288; G01R 31/3696; B60R 16/02; H02J 7/0031; H02J 7/0054; H02J 7/007; H02J 7/0021; H02J 7/342
See application file for complete search history.

(56) References Cited

U.S. PATENT DOCUMENTS

| | | | | |
|---|---|---|---|---|
| 6,157,165 | A * | 12/2000 | Kinoshita | ............... B60L 50/40 320/116 |
| 9,569,949 | B1* | 2/2017 | Jones | ..................... H02J 7/0044 |
| 9,647,355 | B1* | 5/2017 | Ye | ........................... H02J 1/122 |
| 9,735,727 | B2* | 8/2017 | Rummel | .............. H02H 11/003 |
| 2005/0033998 | A1* | 2/2005 | Honda | .................. G06F 1/3228 713/300 |
| 2007/0268048 | A1* | 11/2007 | Komatsu | ............ H03K 17/0822 327/143 |
| 2011/0089899 | A1* | 4/2011 | Xu | .................... H01M 10/4264 320/118 |

(Continued)

*Primary Examiner* — Yusef A Ahmed
(74) *Attorney, Agent, or Firm* — HYIP

(57) ABSTRACT

A fall-off protection and reverse-connection protection system and method for a connecting clamp of an automobile starting power supply. The system has an internal battery, a switching circuit, an access device, a connecting clamp, an MCU control circuit, a voltage division circuit for external battery detection, an output connecting clamp current detection circuit and an anti-reverse-connection protection circuit. In the method, voltage conditions of an external power supply can be effectively detected and different operating actions are taken based on the voltage conditions of the external power supply, thus ensuring normal startup.

1 Claim, 3 Drawing Sheets

(56) References Cited

U.S. PATENT DOCUMENTS

| | | | |
|---|---|---|---|
| 2014/0257632 A1* | 9/2014 | Kanzaki | B60R 16/033 |
| | | | 701/36 |
| 2016/0072323 A1* | 3/2016 | Miller | H02J 7/342 |
| | | | 320/105 |
| 2016/0181587 A1* | 6/2016 | Koebler | H01M 2/1055 |
| | | | 429/7 |
| 2016/0285258 A1* | 9/2016 | Wu | H02H 3/087 |
| 2016/0303989 A1* | 10/2016 | Lei | H02J 7/0026 |
| 2017/0012448 A1* | 1/2017 | Miller | H02J 7/0047 |
| 2017/0288435 A1* | 10/2017 | Miller | G06F 1/263 |
| 2017/0317492 A1* | 11/2017 | Koebler | H01M 4/5805 |
| 2017/0346140 A1* | 11/2017 | Koebler | H01M 10/46 |
| 2018/0162440 A1* | 6/2018 | Uryu | B60R 16/02 |
| 2018/0208237 A1* | 7/2018 | Kumagai | B62D 5/0484 |
| 2018/0233934 A1* | 8/2018 | Miller | H02J 7/0031 |
| 2019/0013692 A1* | 1/2019 | Dellevergini | H02J 7/345 |
| 2019/0081472 A1* | 3/2019 | Guo | H02H 7/18 |
| 2019/0086477 A1* | 3/2019 | Liao | H02J 7/00 |
| 2019/0089172 A1* | 3/2019 | Miller | H02J 7/007 |
| 2019/0181665 A1* | 6/2019 | Shibata | H02J 7/00308 |
| 2019/0229544 A1* | 7/2019 | Inskeep | H02J 7/1461 |
| 2020/0295575 A1* | 9/2020 | Nook | H02J 9/00 |

* cited by examiner

FALL-OFF PROTECTION AND REVERSE-CONNECTION PROTECTION SYSTEM AND METHOD FOR CONNECTING CLAMP OF AUTOMOBILE STARTING POWER SUPPLY

FIELD OF THE INVENTION

The invention relates to a fall-off detection technology for a connecting clamp of an automobile starting power supply, particularly to a fall-off protection and reverse-connection protection system and method for a connecting clamp of an automobile starting power supply.

BACKGROUND OF THE INVENTION

A fault in a connecting clamp of an automobile power supply generally has a serious influence on automobile startup, generally leads to insufficient starting voltage, excessively high starting voltage and reverse connection, and may lead to mechanical or electrical failure if no judgment is made before startup.

SUMMARY OF THE INVENTION

In view of this, a main object of the invention is to provide a fall-off protection and reverse-connection protection system and method for a connecting clamp of an automobile starting power supply.

The invention adopts the following technical solutions.

A fall-off protection and reverse-connection protection system for a connecting clamp of an automobile starting power supply comprises an internal battery, a switching circuit, an access device, a connecting clamp, an MCU control circuit, a voltage division circuit for external battery detection, an output connecting clamp current detection circuit and an anti-reverse-connection protection circuit, wherein the internal battery is connected to the access device by the switching circuit, the access device is connected to the connecting clamp, the MCU control circuit is arranged at a front end of the switching circuit, the voltage division circuit for external battery detection is connected between the switching circuit and the access device, the access device is connected to the output connecting clamp current detection circuit, and the anti-reverse-connection protection circuit is connected to the MCU control circuit.

The invention further provides a fall-off protection and reverse-connection protection method for a connecting clamp of an automobile starting power supply, which comprises the following steps:
step 1: after startup, an ignition key is pressed to enter an ignition state, the access device judges a connection state, i.e. "normal connection"/"reverse connection", and step 2 is executed in case of "normal connection", otherwise, step 5 is executed;
step 2: if the access device is in "normal connection" with the connecting clamp, the external battery detection circuit acts to judge a division voltage signal of an external battery and transmit the division voltage signal to the MCU control circuit;
step 3: the MCU control circuit judges a threshold range of the division voltage and compares the threshold range with a standard threshold set in the MCU control circuit to obtain a comparison result;
step 4: the following operating instructions are executed based on the comparison result obtained in the step 3:

S1: if the detection result falls within the standard threshold, the access device is normally conducted with the connecting clamp;
S2: if the detection result is lower than the standard threshold, the switching circuit is switched on, the access device is connected to the connecting clamp, the internal battery charges the external battery, and then the output connecting clamp current detection circuit detects an on-off state of the connecting clamp in real time; and
S3: if the detection result is higher than the standard threshold, the MCU control circuit controls the switching circuit to be repeatedly switched on and off so as to judge a connection state; and
step 5: if the access device is in "reverse connection" with the connecting clamp, the anti-reverse-connection protection circuit acts and the MCU control circuit controls the switching circuit to be switched off.

Further, the standard threshold voltage is 2-13.2 V.
Further, the following steps are executed in the S2 of the step 2: if the voltage of the external battery is lower than that of the internal battery, the internal battery charges the external battery, then the sampling resistance of the output current from the output connecting clamp current detection circuit is a voltage drop between two ends of a negative line outputted by the internal battery, which is amplified by an operational amplifier IC5 peripheral circuit, an amplified signal V5 is transmitted to a detection port of the MCU control circuit, and the amount of the discharge current from the internal battery to the externally connected external battery is detected to judge whether the ignition connecting clamp falls off: if the value of V5 is greater than 0.05 V, the ignition connecting clamp is judged to be normally connected and the corresponding discharge current value is 1-3 A, i.e. if the discharge current to the external battery is greater than 1-3 A, the switching circuit is always pulled in, the connecting clamp is normally connected and automobile ignition can be normally performed; and if the ignition clamp falls off, the discharge current from the internal battery to the outside is 0 A, the voltage of V5 is 0 V, a RELAY output control pin of the MCU control circuit outputs a low level, Q13 is cut off, the switching circuit is not working and the ignition function is off. Further, the following steps are executed in the S3 of the step 2: if the voltage of the external battery is higher than or similar to that of the internal battery, the current from the external battery to an external circuit is less than 1-3 A, the value of V5 is less than 0.05 V, and then the MCU control circuit controls the switching circuit to be off for 0.5 s and then pulled in for 3 s, which is cyclically repeated to detect whether the connecting clamp falls off: if the connecting clamp falls off during the detection, the output of the switching circuit is off; and if the connecting clamp never falls off during the detection, shutdown is automatically performed after detection for 5 min.

Further, the following steps are executed in the step 4: when the ignition key is pressed to enter an ignition state after startup, if the ignition clamp connected to the access device is in reverse connection with positive and negative plates of the external battery, D16 is positively conducted, a photocoupler IC7 is conducted, a resvese reverse-connection signal detection port of the MCU control circuit is lowered to have zero level, then the MCU switches off K1 and the ignition function cannot be enabled; and if the ignition clamp is correctly connected with the external battery, D16/IC7 is not conducted due to reverse bias, the MCU control circuit detects that a resvese signal has a high level of 5 V, and the ignition function can be normally enabled.

In the technical solutions provided by the invention, voltage conditions of an external power supply can be effectively detected and different operating actions are taken based on the voltage conditions of the external power supply, thus ensuring normal startup. Meanwhile, the invention further provides a protective measure for reverse-connection prevention, which can prevent electrical failure caused by reverse connection.

DETAILED DESCRIPTION OF THE INVENTION

The invention will be described below in detail with reference to the accompanying drawings and particular embodiments. Herein, illustrative embodiments and illustrations of the invention are used for explaining the invention, but do not limit the invention.

Figure 1:
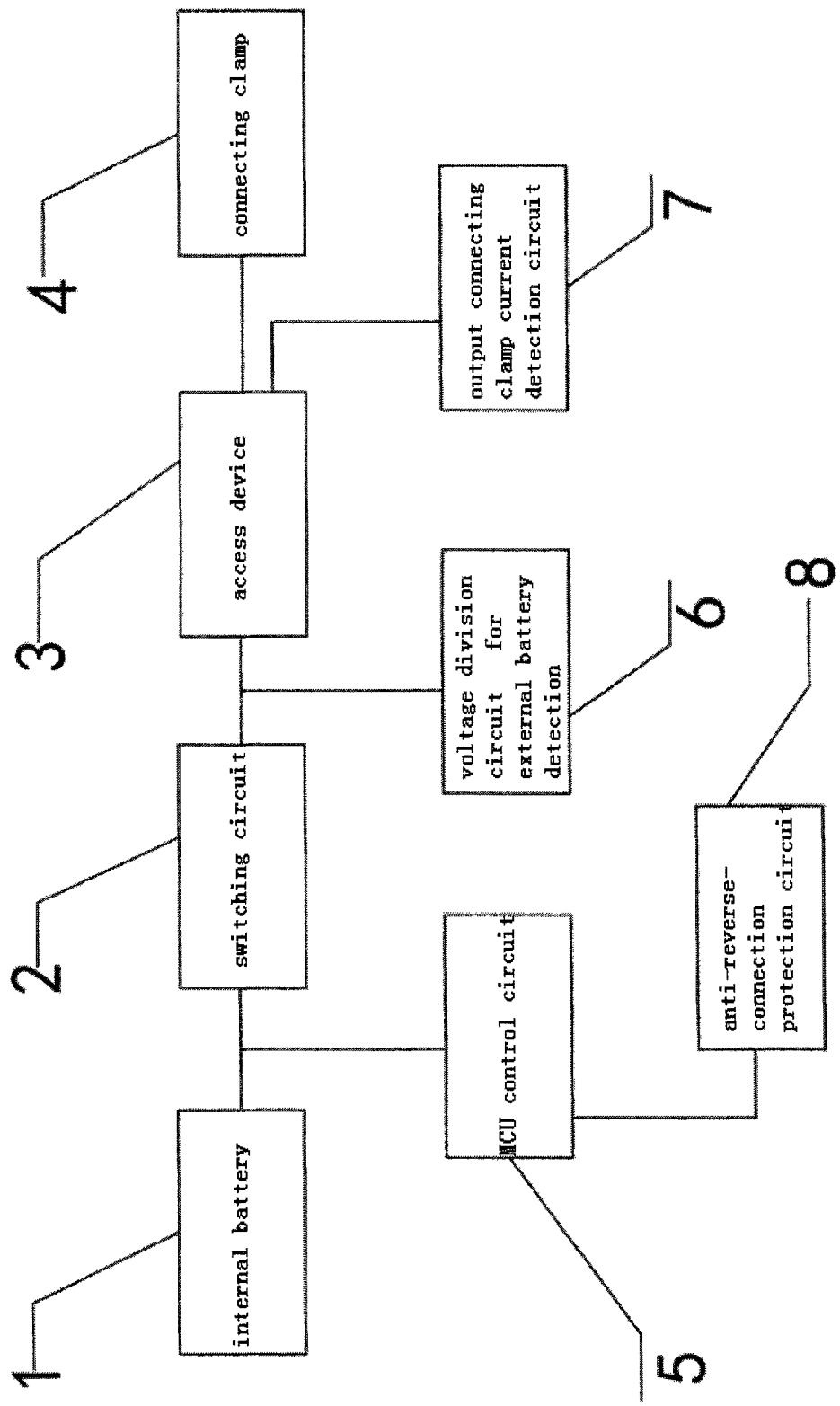
FIG. 1 is a frame principle diagram of a system of the invention.
Figure 2:
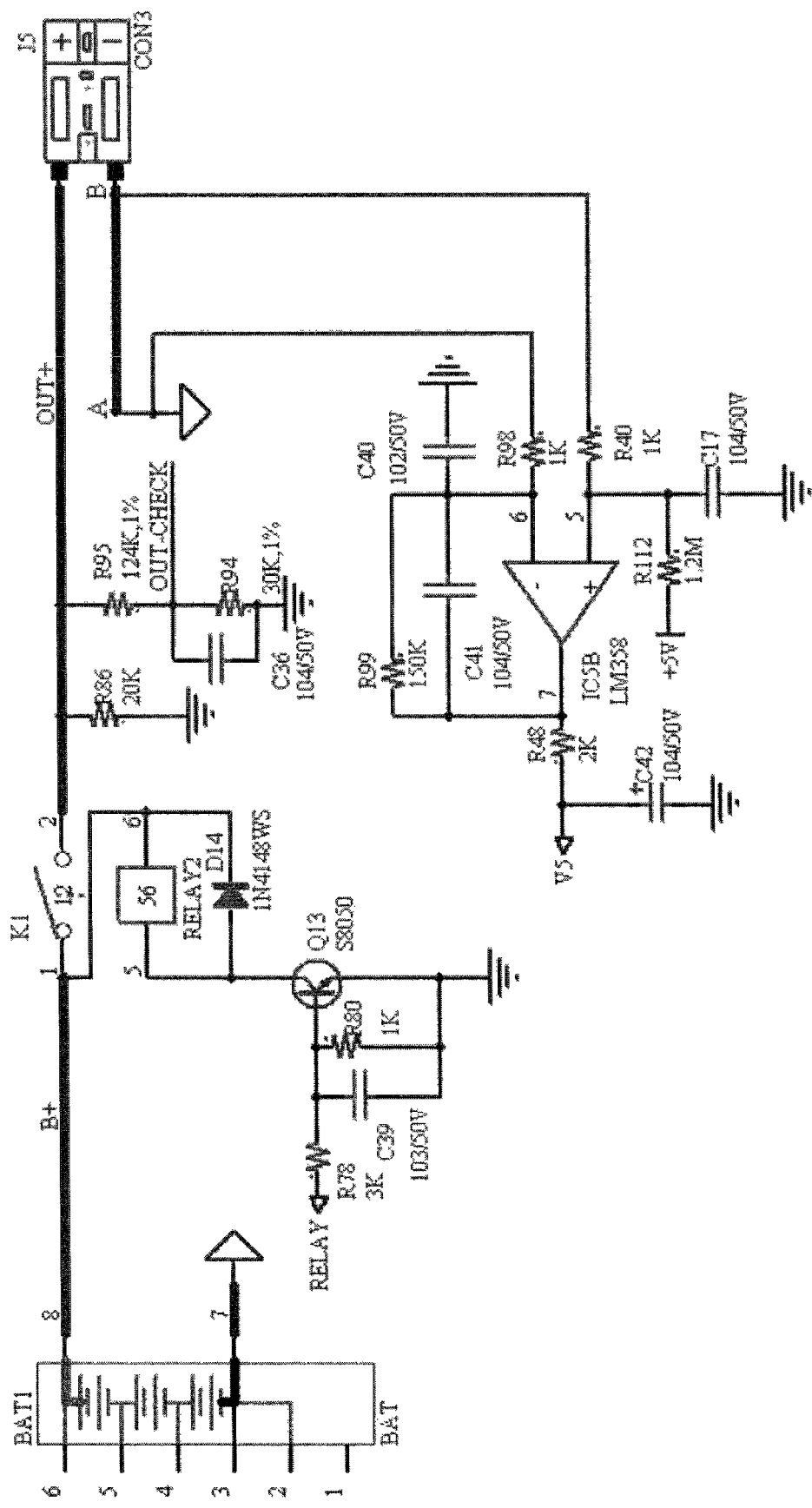
FIG. 2 is a working principle diagram of a fall-off protection circuit for a connecting clamp in the invention.
Figure 3:
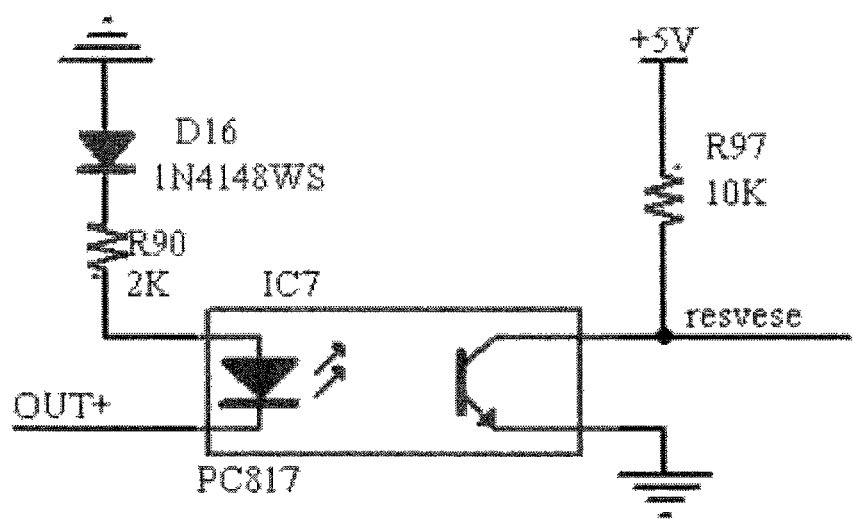
FIG. 3 is a working principle diagram of an anti-reverse-connection protection circuit in the invention.

Referring to FIGS. 1 to 3, the invention discloses a fall-off protection and reverse-connection protection system for a connecting clamp of an automobile starting power supply, which comprises an internal battery 1, a switching circuit 2, an access device 3, a connecting clamp 4, an MCU control circuit 5, a voltage division circuit 6 for external battery detection, an output connecting clamp current detection circuit 7 and an anti-reverse-connection protection circuit 8, wherein the internal battery 1 is connected to the access device 3 by the switching circuit 2, the access device 3 is connected to the connecting clamp 4, the MCU control circuit 5 is arranged at a front end of the switching circuit 2, the voltage division circuit 6 for external battery detection is connected between the switching circuit 2 and the access device 3, the access device 3 is connected to the output connecting clamp 4 current detection circuit, and the anti-reverse-connection protection circuit 8 is connected to the MCU control circuit 5.

The invention further provides a fall-off protection and reverse-connection protection method for a connecting clamp of an automobile starting power supply, which comprises the following steps:

step 1: after startup, an ignition key is pressed to enter an ignition state, the access device 3 judges a connection state, i.e. "normal connection"/"reverse connection", and step 2 is executed in case of "normal connection", otherwise, step 5 is executed;

step 2: if the access device 3 is in "normal connection" with the connecting clamp 4, the external battery detection circuit acts to judge a division voltage signal of an external battery and transmit the division voltage signal to the MCU control circuit 5;

step 3: the MCU control circuit 5 judges a threshold range of the division voltage and compares the threshold range with a standard threshold set in the MCU control circuit 5 to obtain a comparison result;

step 4: the following operating instructions are executed based on the comparison result obtained in the step 3:

S1: if the detection result falls within the standard threshold, the access device 3 is normally conducted with the connecting clamp 4;

S2: if the detection result is lower than the standard threshold, the switching circuit 2 is switched on, the access device 3 is connected to the connecting clamp 4, the internal battery 1 charges the external battery, and then the output connecting clamp current detection circuit 7 detects an on-off state of the connecting clamp 4 in real time; and S3: if the detection result is higher than the standard threshold, the MCU control circuit 5 controls the switching circuit 2 to be repeatedly switched on and off so as to judge a connection state; and step 5: if the access device 3 is in "reverse connection" with the connecting clamp 4, the anti-reverse-connection protection circuit 8 acts and the MCU control circuit 5 controls the switching circuit 2 to be switched off.

Further, the standard threshold voltage is 2-13.2 V.

Further, the following steps are executed in the S2 of the step 2: if the voltage of the external battery is lower than that of the internal battery 1, the internal battery 1 charges the external battery, then the sampling resistance of the output current from the output connecting clamp current detection circuit 7 is a voltage drop between two ends of a negative line outputted by the internal battery 1, which is amplified by an operational amplifier IC5 peripheral circuit, an amplified signal V5 is transmitted to a detection port of the MCU control circuit 5, and the amount of the discharge current from the internal battery 1 to the externally connected external battery is detected to judge whether the ignition connecting clamp 4 falls off: if the value of V5 is greater than 0.05 V, the ignition connecting clamp 4 is judged to be normally connected and the corresponding discharge current value is 1-3 A, i.e. if the discharge current to the external battery is greater than 1-3 A, the switching circuit 2 is always pulled in, the connecting clamp 4 is normally connected and automobile ignition can be normally performed; and if the ignition clamp falls off, the discharge current from the internal battery 1 to the outside is 0 A, the voltage of V5 is 0 V, a RELAY output control pin of the MCU control circuit 5 outputs a low level, Q13 is cut off, the switching circuit 2 is not working and the ignition function is off.

Further, the following steps are executed in the S3 of the step 2: if the voltage of the external battery is higher than or similar to that of the internal battery 1, the current from the external battery to an external circuit is less than 1-3 A, the value of V5 is less than 0.05 V, and then the MCU control circuit 5 controls the switching circuit 2 to be off for 0.5 s and then pulled in for 3 s, which is cyclically repeated to detect whether the connecting clamp 4 falls off: if the connecting clamp 4 falls off during the detection, the output of the switching circuit 2 is off; and if the connecting clamp 4 never falls off during the detection, shutdown is automatically performed after detection for 5 min.

Further, the following steps are executed in the step 4: when the ignition key is pressed to enter an ignition state after startup, if the ignition clamp connected to the access device 3 is in reverse connection with positive and negative plates of the external battery, D16 is positively conducted, a photocoupler IC7 is conducted, a resvese reverse-connection signal detection port of the MCU control circuit 5 is lowered to have zero level, then the MCU switches off K1 and the ignition function cannot be enabled; and if the ignition clamp is correctly connected with the external battery, D16/IC7 is not conducted due to reverse bias, the MCU control circuit 5 detects that a resvese signal has a high level of 5 V, and the ignition function can be normally enabled.

Referring to FIGS. 2 and 3, the invention provides the following embodiment.

Embodiment 1

Analysis of the working principle of a fall-off protection circuit for the connecting clamp 4: when the ignition key is pressed to enter an ignition state after startup, if the ignition clamp connected to J5 is correctly connected to the external battery, the voltage division circuit 6 for external battery detection which consists of a resistor R95 and a resistor R94 transmits the division voltage OUT-CHECK to the MCU control circuit 5 so as to judge whether the voltage of the externally connected external battery is within the normal ignition range (2-13.2 V): if the voltage of the externally connected external battery is detected to be lower than or higher than the normal ignition range, a RELAY output control pin of the MCU control circuit 5 outputs a low level, Q13 is cut off, K1 is not working, a positive electrode of BAT1 is disconnected to J5 and the ignition function is off; and if the voltage of the external battery is 2-13.2 V, K1 is pulled in, BAT1 is connected to J5 and the ignition function is on. After K1 is pulled in: (1) if the voltage of the external battery is lower than that of BAT1 of the internal battery 1 of the product, BAT1 charges the external battery, then the sampling resistance of the output current from the output connecting clamp current detection circuit 7 which consists of an operational amplifier IC5, a resistor R99, a resistor R98, a resistor R40, a resistor R112, a resistor R48, a capacitor C41, a capacitor C17, a capacitor C40 and a capacitor C42 is a voltage drop between two ends of a negative line outputted by BAT1 of the battery, i.e. a voltage drop between point B and point A sampled from the above figure, which is amplified by an operational amplifier IC5 peripheral circuit, an amplified signal V5 is transmitted to an AD detection port of the MCU control circuit 5, and the amount of the discharge current from BAT1 of the battery to the externally connected external battery is detected to judge whether the ignition connecting clamp 4 falls off: if the value of V5 is greater than 0.05 V, the ignition connecting clamp 4 is judged to be normally connected and the corresponding discharge current value is 1-3 A, i.e. if the discharge current to the external battery is greater than 1-3 A, the relay K1 is always pulled in, the connecting clamp 4 is normally connected and automobile ignition can be normally performed; and if the ignition clamp falls off, the discharge current from BAT1 to the outside is 0 A, the voltage of V5 is 0 V, the RELAY output control pin of the MCU control circuit 5 outputs a low level, Q13 is cut off, K1 is not working and the ignition function is off; and
(2) if the voltage of the external battery is higher than or similar to that of BAT1 of the internal battery 1, the current from BAT1 to an external circuit is less than 1-3 A, the value of V5 is less than 0.05 V, and then the MCU control circuit 5 controls the relay K1 to be off for 0.5 s and then pulled in for 3 s, which is cyclically repeated to detect whether the connecting clamp 4 falls off: if the connecting clamp 4 falls off during the detection, the output of the relay K1 is off; and if the connecting clamp 4 never falls off during the detection, shutdown is automatically performed after detection for 5 min.

Analysis of the working principle of the anti-reverse-connection protection circuit 8: the anti-reverse-connection protection circuit 8 consists of a photocoupler IC7/D16, a resistor R90 and a resistor R97, when the ignition key is pressed to enter an ignition state after startup, if the ignition clamp connected to J5 is in reverse connection with positive and negative plates of the external battery, D16 is positively conducted, the photocoupler IC7 is conducted, a resvese reverse-connection signal detection port of the MCU control circuit 5 is lowered to have zero level, then the MCU control circuit 5 switches off the relay K1 and the ignition function cannot be enabled; and if the ignition clamp is correctly connected with the external battery, D16/IC7 is not conducted due to reverse bias, the MCU control circuit 5 detects that a resvese signal has a high level of 5 V, and the ignition function can be normally enabled.

In the technical solutions provided by the invention, voltage conditions of an external power supply can be effectively detected and different operating actions are taken based on the voltage conditions of the external power supply, thus ensuring normal startup. Meanwhile, the invention further provides a protective measure for reverse-connection prevention, which can prevent electrical failure caused by reverse connection.

A technical solution disclosed by an embodiment of the invention has been introduced above in detail, the principles and implementations of an embodiment of the invention have been illustrated herein by particular embodiments, and the description of the above embodiment is only applicable to helping understand the principles of an embodiment of the invention. Meanwhile, those of ordinary skill in the art can make changes in terms of particular embodiments and application scopes based on an embodiment of the invention. In summary, the contents of the present description should not be interpreted as limiting the invention.

The invention claimed is:

1. A fall-off protection and reverse-connection protection system for a connecting clamp of an automobile starting power supply, comprising:
an internal battery, a switching circuit, an access device, a connecting clamp, a micro control unit, a voltage division circuit for external battery detection, an output connecting clamp current detection circuit and an anti-reverse-connection protection circuit;
the internal battery being connected to the access device by the switching circuit, the access device being connected to the connecting clamp, the micro control unit being arranged at a front end of the switching circuit, the voltage division circuit for external battery detection being connected between the switching circuit and the access device, the access device being connected to the output connecting clamp current detection circuit, and the anti-reverse-connection protection circuit being connected to the micro control unit;
wherein,
the access device is configured to judge a connection state of the connecting clamp when an ignition key is pressed to enter an ignition state;
the voltage division circuit for external battery detection is configured to judge a division voltage signal of an external battery and transmit the division voltage signal to the micro control unit if the access device is in normal connection with the connecting clamp;
the micro control unit is configured to:
compare the division voltage signal with a threshold in the micro control unit to obtain a comparison result, control the switching circuit to be switched on if the comparison result is lower than the threshold, and control the switching circuit to be repeatedly switched on and off so as to judge the connection state of the connecting clamp if the comparison result is higher than the threshold;

if the access device is in a reverse connection with the connecting clamp, the anti-reverse-connection protection circuit acts and the micro control unit controls the switching circuit to be switched off; and wherein the output connecting clamp current detection circuit is configured to detect an on-off state of the connecting clamp in real time when the internal battery charges the external battery.

\* \* \* \* \*